United States Patent [19]

Ost

[11] Patent Number: 4,577,224
[45] Date of Patent: Mar. 18, 1986

[54] SECURE CABLE TELEVISION ACCESS SYSTEM WITH TIERING CONTROL

[76] Inventor: Clarence S. Ost, 7905 Bayshore Dr., Margate City, N.J. 08402

[21] Appl. No.: 399,471

[22] Filed: Jul. 19, 1982

[51] Int. Cl.⁴ .................. H04N 7/16; H04N 7/167
[52] U.S. Cl. .................................. 358/114; 358/84; 358/117; 358/122
[58] Field of Search ............... 358/117, 122, 124, 114, 358/84

[56] References Cited

U.S. PATENT DOCUMENTS

| | | | |
|---|---|---|---|
| 4,024,574 | 5/1977 | Nieson | 358/117 |
| 4,068,264 | 1/1978 | Pires | 358/122 |
| 4,091,417 | 5/1978 | Nieson | 358/117 |
| 4,225,884 | 9/1980 | Block et al. | 358/117 |
| 4,268,859 | 5/1981 | Ost | 358/122 |
| 4,369,462 | 1/1983 | Tomizawa et al. | 358/123 |

*Primary Examiner*—S. C. Buczinski
*Attorney, Agent, or Firm*—Charles A. McClure

[57] ABSTRACT

A poach-resistant system enabling cable television subscribers to receive upon request certain programs otherwise unavailable (i.e., "secure") while precluding such reception by non-requesting subscribers as well as non-subscribers. Before transmission of such a secure program the roster of subscribers is scanned at a central control station having complied subscribers' requests for that program, and a resulting string of pulses corresponding in sequence to the respective subscribers is punctuated with program command pulses timed to designate those subscribers who have requested the program. Transmission of the resultant program command signal string over the cable to junctions with leads to the respective subscribers' television sets results in unblocking of such junction for each of the requesting subscribers only. Allocation of plural clocking pulses to each subscriber enables program availability to be tiered as desired. Appropriate circuitry in the junction of each subscriber's lead with the transmitting cable retains control there so that unauthorized program signals never enter a subscriber's premises, where security could be defeated.

16 Claims, 12 Drawing Figures

SECURE CABLE TELEVISION ACCESS SYSTEM WITH TIERING CONTROL

This invention relates to control of access to wired or similarly channeled program transmission, a prominent example being subscriber cable television, wherein reception is blocked to non-requesting subscribers and is unblocked to requesting subscribers, usually on a program-by-program basis and with corresponding accrual of charges to be paid by the requesting subscribers. Such programs may be termed "secure" to distinguish them from programs otherwise readily available to subscribers. Inasmuch as this application is concerned specifically therewith it will be understood that in the absence of contrary designation herein any program mentioned is intended to be a secure program even if not so identified.

Numerous attempts to control access to subscription cable television program transmission have been made but have proved largely unsuccessful for a variety of reasons, such as being on the one hand so simple as to be readily defeated at a subscriber's television receiver, or on the other hand so complex as not to be suited for use with existing cable setups. Easy poaching by non-paying subscribers or outsiders renders presentation of expensive programs uneconomical, whereas costly reworking of the lines to accommodate a complex control system is not even economically feasible. Inability to resolve that dilemma has precluded subscription cable television from presenting the anticipated quality and range of programs and has resulted in considerable subscriber dissatisfaction and consequent constraint upon expansion of cable television.

My U.S. Pat. Nos. 4,161,751 and 4,268,859 (which are incorporated herein in their entirety by this reference) have presented a high-security cable television access system free of the foregoing problems and adapted for use with a wide variety of system designs without necessity for redesign to accommodate it and without undue expense, indeed very economically and reliably.

In essence, that system transmits to all subscribers, in advance of program transmission, clocking pulses timed to correspond serially to the respective subscribers and punctuates each requesting subscriber's clocking pulse with a command pulse—omitted from non-requesting subscribers' clocking pulses. Tap-off apparatus located at the junction of the transmitting cable with the lead down to each subscriber's TV set, contains control circuitry that recognizes whether the given subscriber's identifying clocking pulse is punctuated by a command pulse (or not) and enables secure program signals to pass to the subscriber's down lead only if the command pulse is also present.

A primary object of the present invention is improvement of that highly secure system of mine for controlling access to cable television (or similarly channeled communication programs) by extending such control to multiple programs available simultaneously, still without enabling or unauthorized program signal to enter a subscriber's premises.

Another object of this invention is provision of such a poach-resistant access control system with tiering control of multiple programs differentiated according to cost or other availability criteria and adapted to existing cable television facilities with minimal modification.

A further object of the invention is embodiment of components of such access control system in an outside junction between the cable and the lead to each subscriber's television receiver, usually called a "tap off" herein.

Other objects of the present invention, together with means and methods of attaining the various objects will be apparent from the following description and the accompanying diagrams of a specific embodiment thereof, which is presented by way of example rather than limitation. The first seven drawings (FIGS. 1 to 7) were shown and described in similar manner in my aforementioned patents, whereas the subsequent views and text disclose the present invention as an extension thereof or improvement therein.

Figure 4:
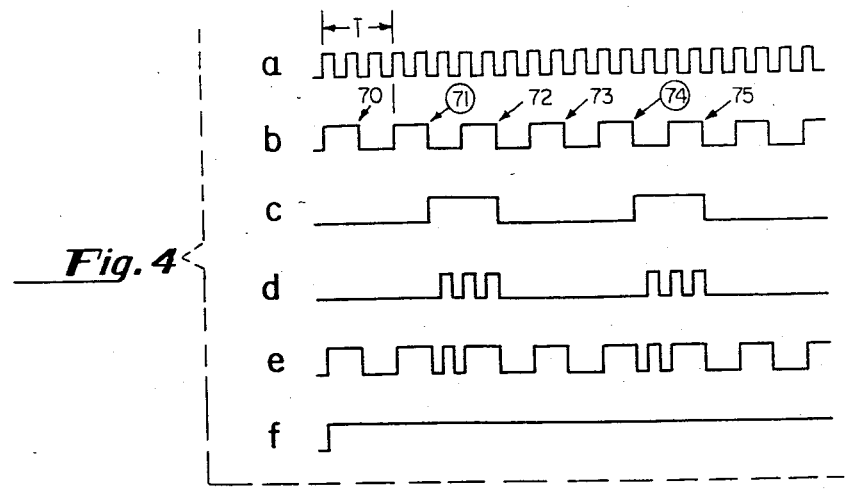
FIG. 4 is a set of graphical representations of signals provided at the head or transmitting end of the access control means of FIG. 3.
Figure 6:
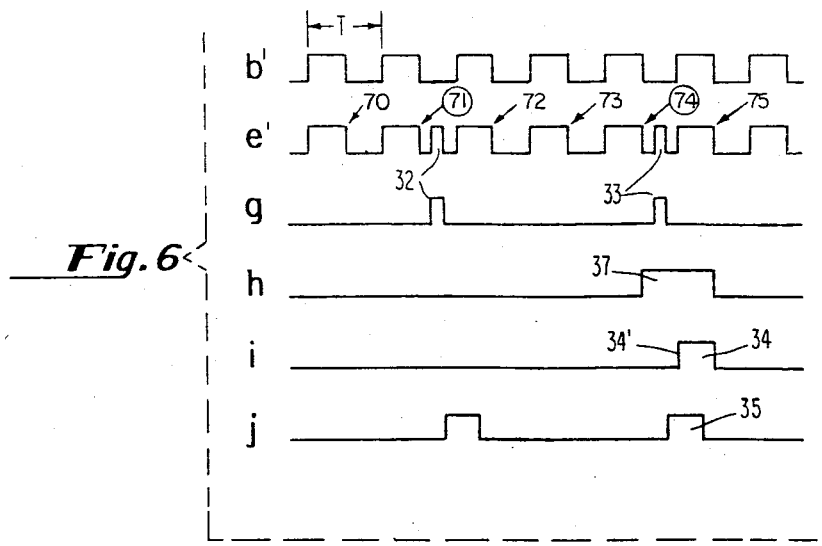
FIG. 6 is a set of graphical representations of signals provided at the FIG. 5 subscriber's location.
Figure 5:
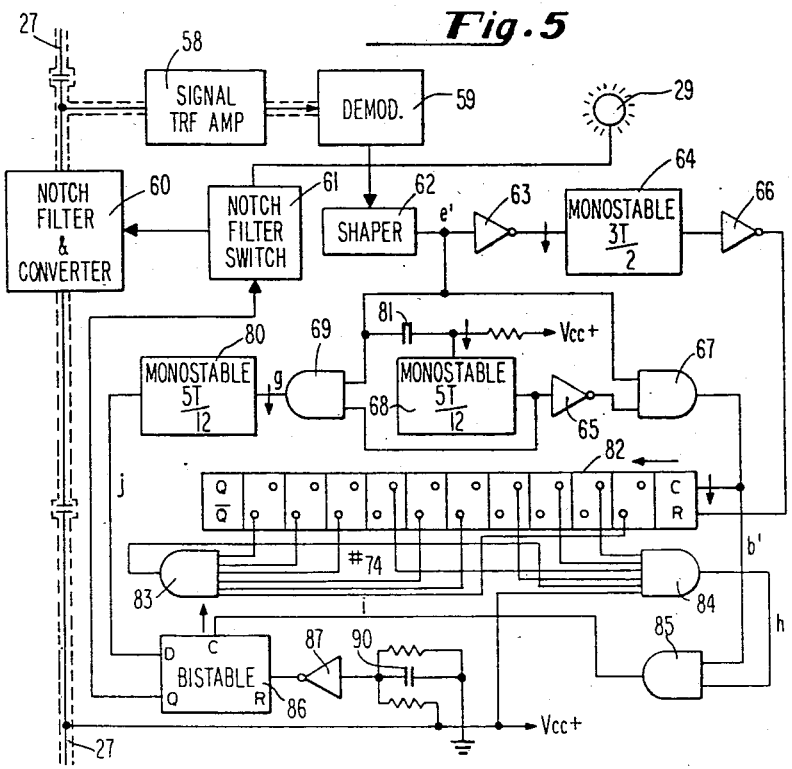
FIG. 5 is a circuit diagram, largely in component block form, of access control means located locally as at the junction of the cable with a lead to a given cable television subscriber's television receiver.
Figure 8:
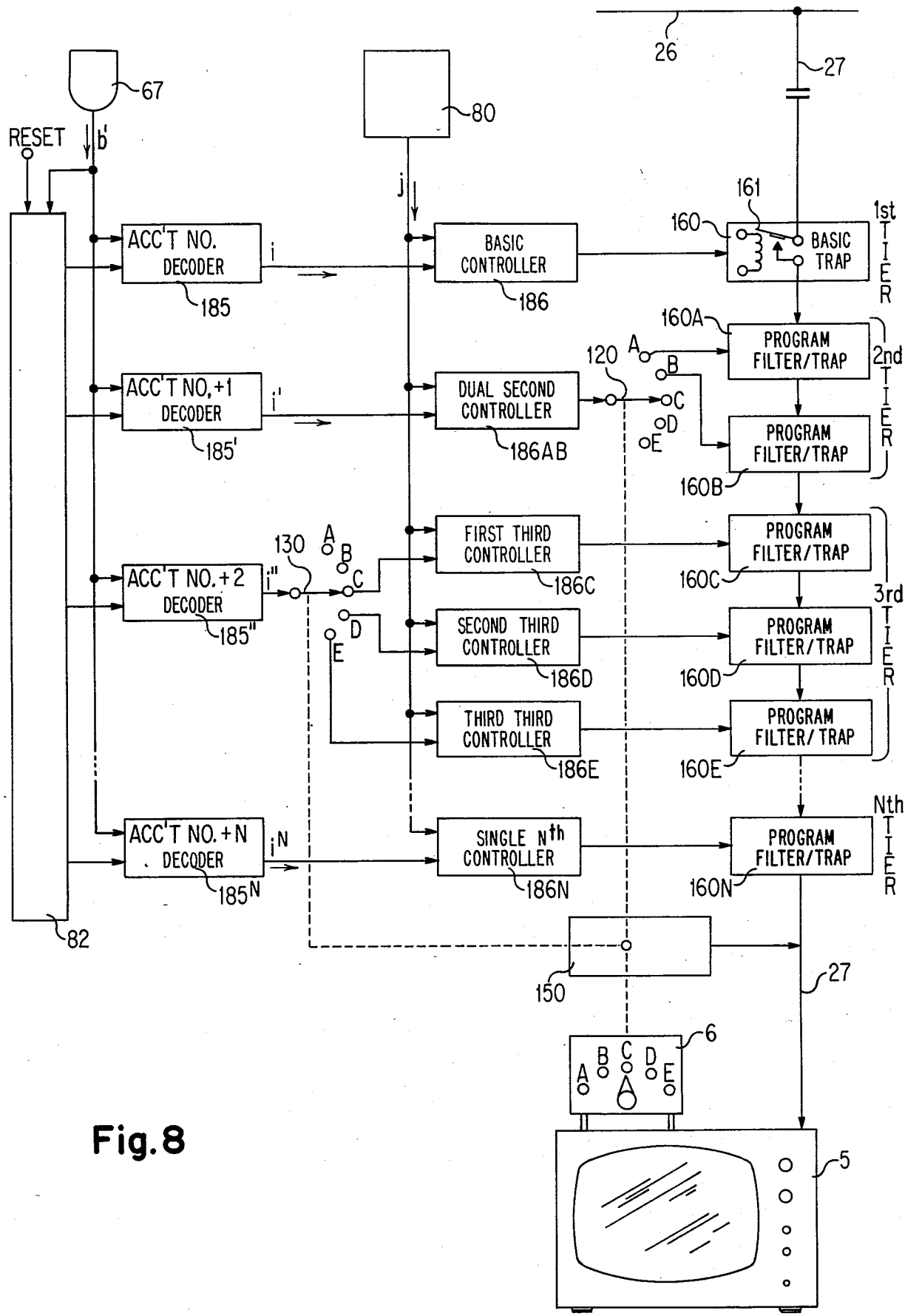
FIG. 8 is a schematic diagram of a further or extended arrangement of locally situated access means especially adapted for tiering access to multiple programs simultaneously available.
Figure 9:
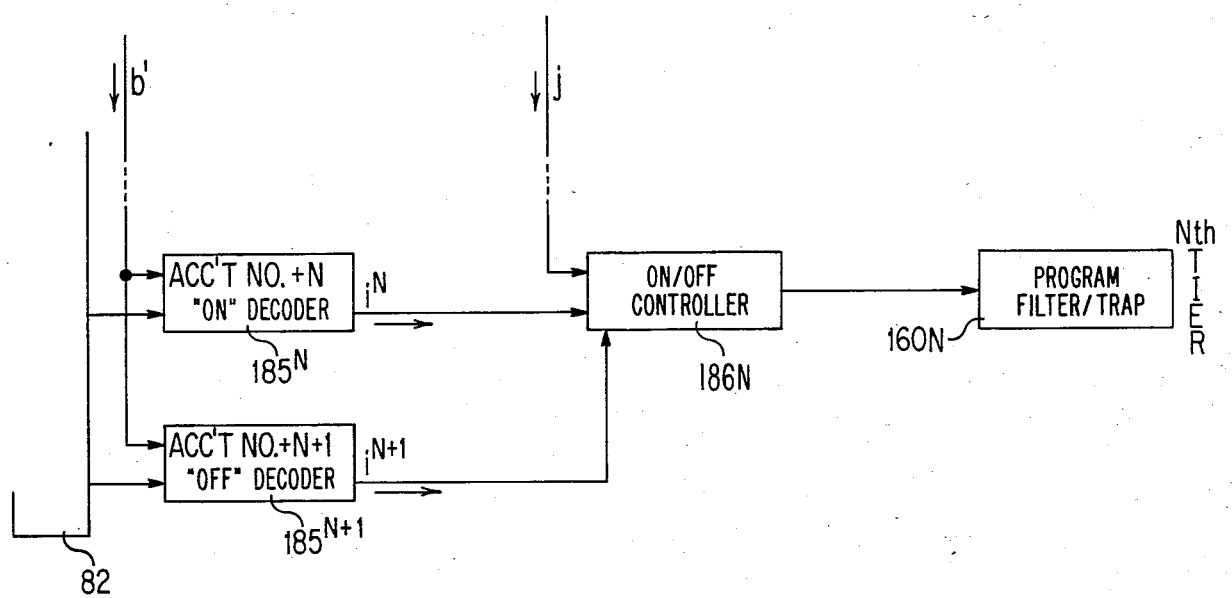
FIG. 9 is a schematic diagram of a modification of part of the program access control arrangement of FIG. 8.

FIGS. 10-4, 10-5, and 10-6 are modifications of FIGS. 4, 5, and 6, in accordance with the embodiments of FIGS. 8 and 9.

In general, the objects of the present invention are accomplished by providing, to requesting cable television subscribers, access to a multiplicity of simultaneously available secure program signals transmitted over the cable and via interconnections including tap offs and down leads to the subscribers' television receivers. This is done by generating a string of clocking pulses corresponding to serial numbering of all the subscribers, allocating to each subscriber a plural number of such serial clocking pulses, and providing every subscriber with tap off means for recognizing that subscriber's clocking pulses, thereby "addressing" each given subscriber by a time-based counting method and enabling a plurality of program access steps to be carried out for each such subscriber. Combined with the clocking pulses corresponding to the respective requesting subscribers in the clocking string are program command pulses corresponding to requested programs, thereby constituting a program command signal string. The program command signal string is transmitted via the cable to each of the subscribers' tap offs, and at each subsciber's location the tap off means functions to separate the command pulses from the clocking pulse string by generating pulses characteristic of each such subscriber's plurality of serial numbers clocked synchronously with the clocking pulse string and utilizing one or more command pulses coincident with the corresponding subscriber's clocking pulses to gate requested program signals to that subscriber's television receiver.

More particularly, the invention provides a method of tiering sets of simultaneous cable TV program signals that may be differentiated according to cost or other availability criterion. It does so by providing separate control circuitry for each such clocking/command pulse pair, in diverse arrangements of differential control, which in the extreme can preclude any program signal from reaching a subscriber or can provide the subscriber with a multiplicity of programs to choose from on different levels of availability.

This invention, in apparatus embodiment of the foregoing system and method, features an interconnecting poach-resistant tap-off, between the cable and the down lead to a subscriber's television receiver, comprising a plurality of means for blocking program transmission from the cable to the down lead, and plural means for inactivating the plurality of blocking means. Included is control means comprising structure responsive to clocking signals and thereby identifiable with a given subscriber rather than any other subscriber and adapted to decode command pulses from a command pulse signal string transmitted from the station over the cable and containing coincident serial clocking pulses corresponding to the given subscriber. The control means also includes means responsive to such decoded command pulses and effective to inactivate the blocking means and thereby enable program reception by the subscriber.

Figure 1:
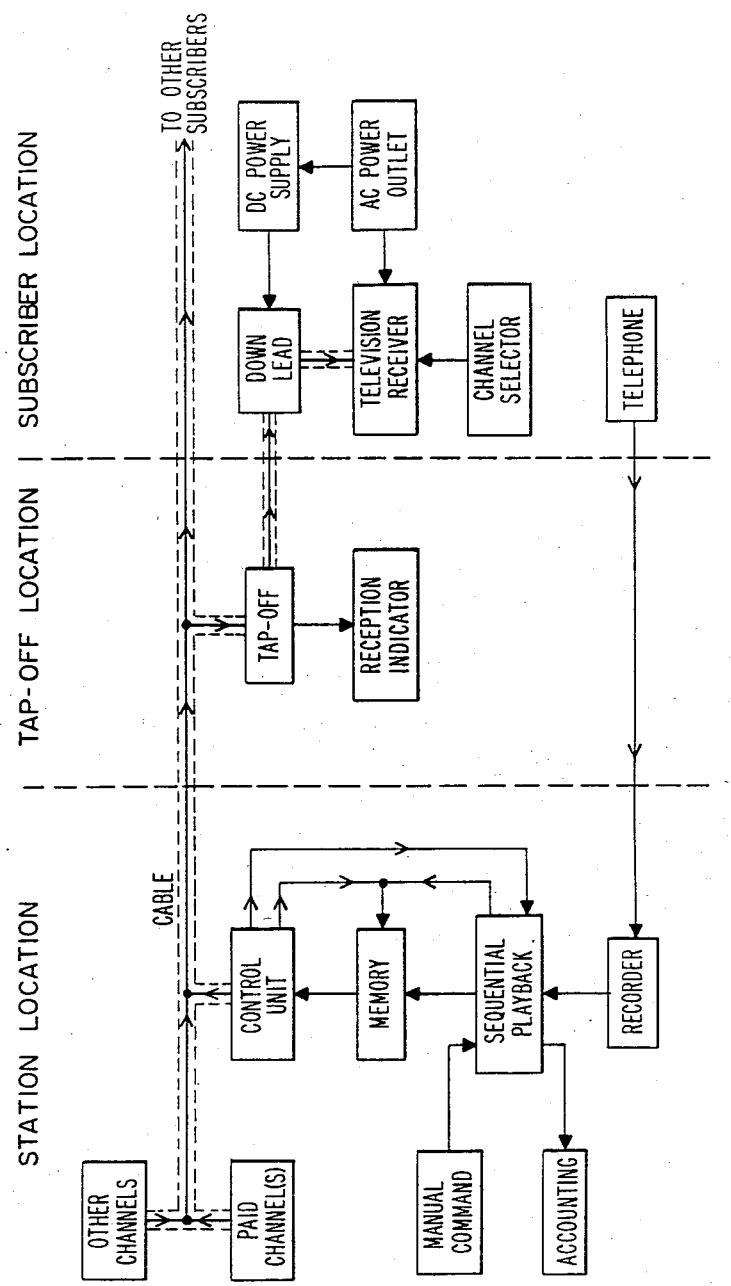
FIG. 1 is a block diagram of the interrelation of components useful in the practice of such a high-security access system from a cable television station to a subscriber's location.

FIG. 1 shows schematically apparatus components useful in a high-security system as described, with those at or in the vicinity of a transmitter or central control station grouped at the left, with those at a subscriber's location grouped at the right, and with the cable extending therebetween, and to an intervening tap off junction.

At the STATION LOCATION a RECORDER receives the subscriber's requests (from a TELEPHONE at the subscriber's location) each other subscriber also having telephone or other access to the recorder. A SEQUENTIAL PLAYBACK unit is located between the RECORDER and a MEMORY and is adapted, upon MANUAL COMMAND or a signal from the CONTROL UNIT to which the MEMORY is connected, to update the memory with identification of subscribers requesting program access and is adapted also to actuate automatic ACCOUNTING equipment so as to ensure that those subscribers are billed for the requested program. The CONTROL UNIT output is connected to the CABLE, as are the PAID CHANNEL(S) and any OTHER CHANNELS of program transmission.

At the intervening SUBSCRIBER LOCATION a TAP OFF at the junction with the CABLE connects with a DOWN LEAD to the subscriber's TELEVISION RECEIVER. An AC POWER OUTLET supplies the TELEVISION RECEIVER and also a DC POWER SUPPLY (low voltage) connected to the DOWN LEAD to power the control circuitry in the TAP OFF, which has a RECEPTION INDICATOR associated therewith. A CHANNEL SELECTOR enables selection of one from among a plurality of secure PAID CHANNELS when present. Also here is the subscriber's TELEPHONE, already mentioned as useful in transmitting program requests, which alternatively might be delivered in person, by mail, etc., and recorded in like manner—or be sent via the TV cable in a compatible bilateral system.

Figure 2:
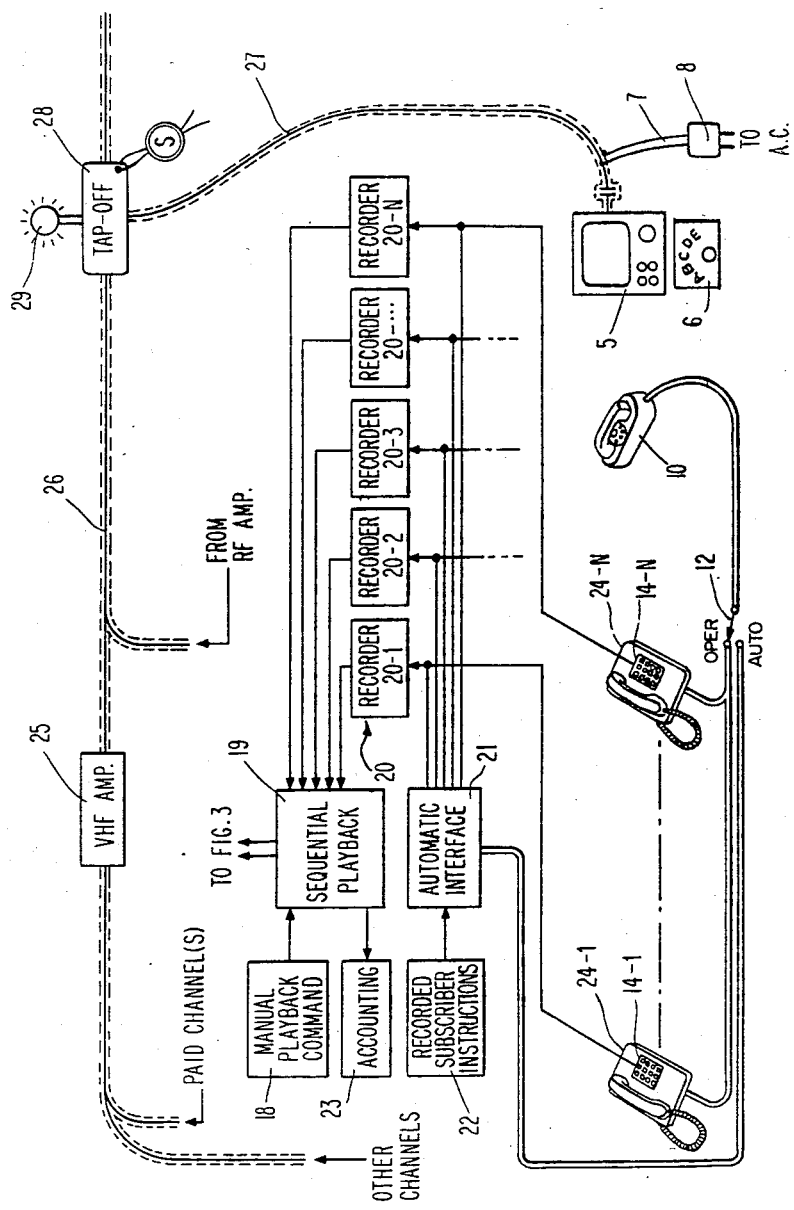
FIG. 2 is a largely schematic but partly pictorialized view of communications means arranged similarly to FIG. 1.

FIG. 2 shows much of the apparatus and interconnection indicated in the preceding view, some of it more pictorially and some of it in greater detail. A subscriber's telephone 10 is connected to switch 12, shown in operator position, further connected through a plurality of keysets 24-1 to 24-N, with respective touch-tone keyboards 14-1 to 14-N for from 1 to N operators to use in recording any given subscriber's program request in one of corresponding set of recorders 20. Any suitable number may be used commensurate with the request load: designated here as RECORDER 20-1, RECORDER 20-2, RECORDER 20-3, . . . RECORDER 20-N. In the alternative AUTOmatic position of switch 12 a subscriber's call so received is exposed to RECORDED SUBSCRIBER INSTRUCTIONS 22 prescribing the form and content of a request, which so given is routed through AUTOMATIC INTERFACE unit 21 to one of the recorders. The recorders' output is made available via Sequential Playback means 19, as at the instance of Manual Playback Command means 18, to the central control unit in FIG. 3.

Cable 26 receives transmitted TV program via secure PAID CHANNEL(S) and OTHER CHANNELS through VHF AMP 25 and proceeds to the indicated subscriber's TAP OFF 28 at the junction with that subscriber's down lead 27 to television receiver 5 (FIG. 2). Also connected to the down lead is low-voltage dc power lead 7 supplied by dc power supply 8 connected to an ac outlet, thereby energizing the TAP OFF via the down lead. Visual indicator 29 on the TAP OFF is provided to indicate secure program reception. The TAP OFF is provided with seal S as an indication of construction that cannot be opened without breaking the seal. The TAP OFF is shown on part of the cable suspended in the air as a further deterrent to tampering. Of course, if a cable is underground rather than above ground the tap off can be located in a locked pedestal, where it would be accessible only to authorized personnel.

Channel selector 6, juxtaposed to the subscriber's TV receiver, is useful in selecting from among a plurality of simultaneously available secure programs by means of channel selector knob 6K, which is shown with five selection positions: A, B, C, D, and E. If only a single secure paid channel is unblocked, no selection action would be in order. Operation of such channel selector while maintaining program security is explained further in the description of FIG. 8.

Figure 3:
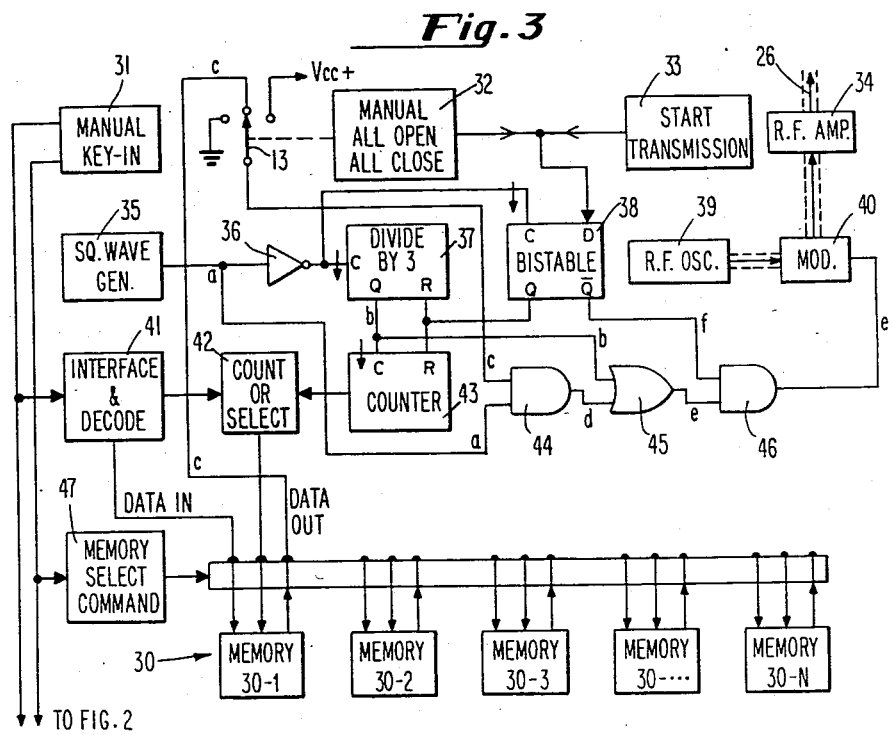
FIG. 3 is a circuit diagram, largely in component block form, of access control means located centrally and corresponding to the control unit of FIG. 1.

FIG. 3 shows the CONTROL UNIT of FIG. 1, comprising circuitry such as is conveniently located at or in the vicinity of a cable television station or similar central location. Here there are a plurality of memory units 30: designated as MEMORY 30-1, MEMORY 30-2, MEMORY 30-3, . . . MEMORY 30-N. Each such memory can store the identification of subscribers requesting access to a given program, together with suitable indication of such request. Each such memory may be connected into the rest of the circuit by MEMORY SELECT COMMAND unit 47, and MEMORY 30-1 is shown so connected to receive DATA IN via INTERFACE AND DECODE unit 41 from the recorders via SEQUENTIAL PLAYBACK unit 19 shown in FIG. 2, and directed to the proper address(es) by the SELECT part of COUNT OR SELECT unit 42. These various components are subject to actuation by MANUAL KEY-IN unit 31 connected as shown in FIGS. 2 and 3, which is also adapted to actuate the COUNT part of unit 42 so as to provide DATA OUT to switch 13 and therethrough to the rest of the CONTROL UNIT, shown here. Three-way switch 13 is manually actuable by MANUAL ALL OPEN ALL CLOSE unit 32 and is shown set at its intermediate DATA OUT position between its leftmost (grounded) position and its rightmost (Vcc+) position, the consequences of which are described further hereinafter.

It should be understood that each such memory is preferably of conventional random-access, single-bit per location type and that there are as many memories as there are secure programs that can be requested. Thus, if there are five such programs per day requestable up to thirty days in advance, a total of 150 memories would be required. Each memory has a separate and unique location therein corresponding to each subscriber in the set or roster of all subscribers, addressable in suitable manner by numerical designation, as by each subscriber's account number, for example. After a preliminary clearing routine (0's in each location), the memories are updated from time to time with the randomly received and recorded program requests, through the SELECT part of MEMORY SELECT COMMAND unit 47, and for any given memory (corresponding to a particular requested secure program) each requesting subscriber's location therein is addressed and a logical "1" stored as DATA IN. Thus, when the appropriate memory is scanned just before the scheduled time for transmission of a given secure program, via the COUNT part of COUNT OR SELECT unit 42 in serially addressing each subscriber's location therein in synchronism with the clocking pulses, each clocking pulse corresponding to a requesting subscriber is punctuated by a mark or command pulse, thereby converting the string of clocking pulses to a command pulse signal string. Consequences of such evidence that certain subscribers wish to receive the program are described more fully below. For simplicity of description only a single such program is considered at first. In description of FIG. 8 multiple secure programs (simultaneously available) are considered.

FIG. 4 shows graphically a half dozen signal waveforms or pulse strings, designated as a to f, present during operation of the CONTROL UNIT, shown in the last preceding view, at locations therein so indicated. Operation of that unit to provide an unblocking command for each subscriber who has requested (and has paid or is being billed for) a secure program is now described by reference to both FIGS. 3 and 4.

Shortly before transmission of a given secure paid channel program begins, the corresponding memory (here MEMORY 30-1) is selected, as by keying in a memory code via MANUAL KEY-IN unit 31 through MEMORY SELECT COMMAND 47. The MANUAL KEY-IN unit also is useful for keying last minute request data via INTERFACE AND DECODE unit 41 directly into the memory, bypassing the recorders. SQUARE-WAVE GENERATOR 35 provides waveform a, preferably at some medium audio frequency (e.g., 500 Hz.), which is inverted by inverter 36, and then clocks DIVIDE by 3 counter 37 so as to provide waveform b of period T at its Q output, which is fed to COUNTER 43. As indicated, counter 37 is negative edge triggered by the inverted signal and is clocked thereby in synchronism with the output of the square wave generator. BISTABLE unit 38, which is similarly triggered by the inverted signal has its Q output connected to reset R of counter 37 to synchronize it with the positive transition from that signal so that the counter will stabilize before its first useful negative transition input. Such input occurs when a logical zero is placed on the D terminal of the BISTABLE through START TRANSMISSION unit 33, which may be operated manually or automatically, as on a time basis. Signal waveform b now clocks COUNTER 43, which in turn through the COUNT section of unit 42 addresses each location in the memory sequentially and determines whether at each subscriber location a program request has been stored, such as in the form of a logical "1". Those locations containing such a coded request produce an output pulse, two such pulses being shown on signal waveform c, corresponding to subscribers 71 and 74 where the first pulse shown in waveform b corresponds to subscriber 70 and the last pulse shown complete corresponds to subscriber 75. Signal waveform c is anded in AND gate 44 with basic square waveform a, producing signal waveform d, which shows three pulses at each occurrence of the long pulse in c. Signal waveform d is ored with clocking waveform b in OR gate 45, giving split-phase mark composite waveform e in which the second or negative half of the clocking waveform corresponding to each of the requesting subscribers is punctuated by a shorter command pulse, whereupon e is properly designated in its entirety as a program command signal string. AND gate 46 receives both e and the $\overline{Q}$ output from BISTABLE 38, and functions as a switch, being opened when a logical "1" appears at such output to pass the program command signal string to MODULATOR unit 40 fed with a radio frequency carrier from RF OSCILLATOR unit 39. The RF waveform modulated with the program command signal string is amplified by RF AMPLIFIER unit 34 and then passes along cable 26 (to the junctions with the lead-ins to the respective subscribers' television receivers). As already indicated each subscriber has a tap off between the cable and subscriber's down lead to the receiver, and the circuitry of such a tap off is shown in more detail in the next view.

FIG. 5 shows TAP OFF 28 circuitry useful in accordance with this invention, and FIG. 6 shows graphically signal waveforms or pulse strings present during operation thereof. Operation of this unit to unblock program transmission (and to reblock it) to the television set of a given subscriber, having requested it, is now described with reference to these last two views. The exemplified subscriber is no. 74 in the clocking sequence.

The first component encountered in down lead 27 from the TAP OFF junction (after a dc blocking capacitor, unnumbered) is the SIGNAL TRF AMPLIFIER unit 58. The amplified output signal is fed to DEMODULATOR unit 59 which extracts command pulse signal string e' (shown after being squared up in SHAPER 62 and so designated to distinguish it from its original counterpart shown in FIG. 4), only a portion thereof being illustrated. The final component interconnecting with down lead 27 to the subscriber's television receiver (except for another unnumbered dc blocking capacitor) is NOTCH FILTER AND CONVERTER unit 60. When active a notch filter acts like the inverse of a bandpass filter, screening out a band of frequencies as by shunting them to ground; when the notch filter is deactivated or switched off, such band of frequencies will be transmitted by it. Between the DEMODULATOR and latter unit is the circuitry so depicted in FIG. 5, which functions as follows:

Demodulated and shaped command pulse signal string e' is fed directly to inverter 63 and to AND gates 67 and 69. AND gate 67 also receives a stretched and inverted version produced by MONOSTABLE 68 (with a time constant of less than T/2, say 5T/12) from the negative excursions of e' after passage through capacitor 81. After inversion by inverter 65, the stretched waveform is combined with e' in AND gate 67 to recover a clocking counterpart b' (FIG. 6) of the original clocking string lacking program command pulses. This string is fed to the count terminal of ripple counter 82 and clocks it accordingly provided that a logical "0" appears at reset input R. This occurs on the first positive transition of signal e' applied through inverter 63 to MONOSTABLE unit 64, which is negative edge triggered and has a time constant greater than T (say, 3T/2) thus maintaining its logical "1" output so long as the signal is present. This output is inverted in inverter 66 and is applied to reset R input of the ripple counter, thus rendering the clocking input effective.

Ripple counter 72 as shown has a capacity of ten bits and is specifically prewired to produce a logical "1" output from AND gate 84 when the count reaches "74" as the exemplified subscriber's serial identification. The wired Q outputs are anded in gate 84, and the wired $\overline{Q}$ outputs are anded in gate 83, whose output in turn is also applied to AND gate 84. The output of gate 84 is shown in FIG. 6 as signal waveform or single pulses h, which is anded with clocking signal b' (from gate 67) in AND gate 85 to give a shorter pulse, i, delayed to the rise of the next clocking pulse and whose rising edge triggers BISTABLE unit 86, which transfers the logical state on D input of the BISTABLE to the Q output.

AND gate 69 ands command pulse signal string e' with the signal from MONOSTABLE unit 68, whose time constant is short (e.g., 5T/12), resulting in signal waveform g containing only the requesting subscribers' command pulses, the clocking pulses having been eliminated. Applied to and stretched by MONOSTABLE unit 80, also with a short (e.g., 5T/12) time constant, this gives signal waveform j. The positive rising edge of the pulse shown at i and introduced at C of BISTABLE unit 86, will transfer a logical "1" (in consequence of coincident presence of recovered command pulse 35) from input D to output Q of the bistable as an enabling pulse. The TAP OFF is thus responsive only to this particular subscriber's command pulse rather than to any of the others in the command pulse signal string.

The logical "1" now stable at output Q of the BISTABLE actuates NOTCH FILTER SWITCH 61, which in turn lights reception indicator 29 as well as (more importantly) deactivating the NOTCH FILTER, whereupon transmission of a secure PAID CHANNEL program continues via down lead 27 to the subscriber's television receiver shown in previous views.

Upon conclusion of program transmission the notch filters of all subscribers are readily reactivated to reblock secure program transmission from any of the down leads to the television receivers. The arm of switch 13 (FIG. 3) is moved to the left, disconnecting it from DATA OUT of any memory and connecting it to ground, thereby grounding one of the inputs to AND gate 44. The output from that gate is then a logical "0" (regardless of the other input, which is original square wave a) and when ored with the DIVIDE BY 3 output in OR gate 45 provides the latter (i.e., the clocking pulse string free of command pulses) as output. This output is modulated, transmitted over the cable, and demodulated at each subscriber's tap off, the result being that the signal j and input D of BISTABLE unit 86 remain at logical "0" throughout the entire count and, as the count reaches each subscriber's number in turn, the rising edge of the pulse in signal waveform i transfers that logical "0" from D to output Q of BISTABLE 86, thus acting as a disabling pulse and blocking further reception of secure programs by reactivating the NOTCH FILTER part of unit 60. Only about a minute or less is required to unblock the tap offs of subscribers having requested the next program transmission, as already described in detail.

If it should become desirable to open all tap offs so as to transmit any given program (or group of programs) to the television receivers of all subscribers, the arm of switch 13 is thrown to the right so as to provide a logical "1" as the upper input to AND gate 44, which has the original square wave as the lower input. The output from gate 44 ored with the DIVIDE BY 3 output then provides command pulse signal string e having a command pulse punctuating every clocking pulse. Accordingly, when each subscriber's prewired count is reached, the subscriber's notch filter will be deactivated. Upon conclusion of such free transmission further transmission may be blocked with switch 13 moved to the opposite position as already described.

Designation of unit 60 as NOTCH FILTER AND CONVERTER indicates that the unit includes means, such as a frequency converter, whereby a paid channel can be shifted to appear on a channel to which the subscriber's receiver can be tuned in conventional manner. If a band of several different channels is controlled by the filter, the subscriber may choose from among them by switching channel selector 6 to control selection means in the tap off. Notwithstanding such auxiliary control over selection from among unblocked channels, it will be understood that the subscriber has no control whatever over unblocking of the transmission except by way of requesting it as first described.

Such security of the access system of this invention is preserved in the face of possible electrical power intermittency or attempts by a subscriber to influence the tap off circuitry through manipulating the electrical power connection via plug 8 (FIG. 2). By ensuring application of a momentary logical "1" (after passage through inverter 87) at reset R of BISTABLE 86 (FIG. 5) the network of resistors 88 and 89 and capacitor 90 in the power lead preclude the presence of an unblocking logical "1" at the Q output of the BISTABLE except as intended by way of a command pulse for the subscriber in the command pulse signal string sent over the cable from the control station at the head end of the cable.

Figure 7:
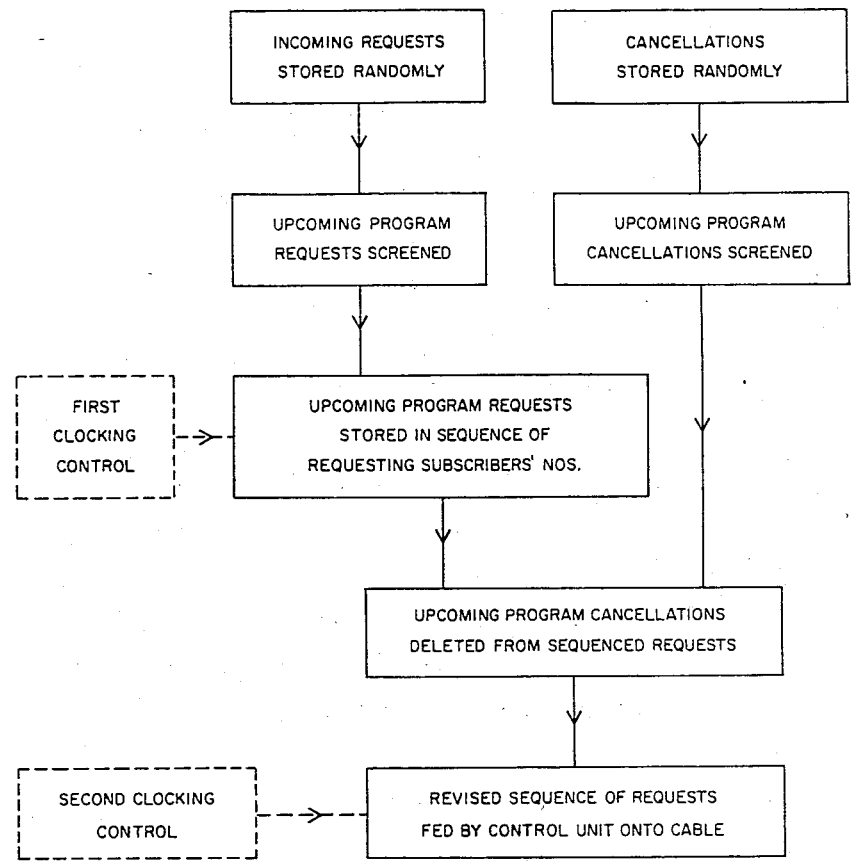
FIG. 7 is a schematic flow diagram of consolidated processing of program requests and cancellations.

FIG. 7 shows schematically the processing of incoming program requests and cancellations consolidated as in an appropriately programmed computer, which may be of general purpose type or specialized for this purpose. Incoming requests for programs are stored randomly, as indicated here at the upper left. Independently, cancellations of program requests are received and stored randomly, as indicated at the upper right. When a particular program is coming up next, the program requests are screened and the requests for the upcoming program are stored in sequence of the requesting subscribers' numbers. Preferably, subject to the indicated first clocking control (located in the control unit, see FIG. 1) request-free pulses at corresponding time intervals (of equal duration individually) are inserted for non-requesting subscribers in the sequence at this point to complete the string; alternatively, such pulses may be provided later by the second clocking control, located in the control unit. The stored cancellations are screened for requests to cancel the upcoming program, and the cancelled program requests are deleted from the sequence of requesting subscribers. The revised sequence of requests is then fed by the control unit onto the cable in the form of a pulse string as in FIG. 1. Each subscriber's sequential time interval in the string is characterized as before by either the presence or the absence of a command pulse, depending upon whether the particular subscriber has requested the upcoming program (and has not cancelled that request) or has failed to do so.

FIGS. 8 and 9 illustrate means and methods for enabling multiple simultaneously available programs to be handled similarly, whether individually or together, or some separately and others together. This is accomplished by extension of the apparatus and procedures already described. Insofar as program availability at more than one level is involved, the term "tiering" is conveniently used here for any and all modifications with simultaneously available programs, whether or not there is any superordinate/subordinate relationship between them.

Instead of designating only a single clocking pulse per subscriber, the extended system endows each subscriber with a plurality of pulses, conveniently (though not necessarily) consecutively. Each subscriber may be allocated as many as ten pulses, for example, or—if more appropriate to specify in binary terms—eight or sixteen. Given subscriber number 74, as in the foregoing description, a ten-pulse allocation would conveniently comprise serial pulses 741 through 750—which might be thought of as increments to an account number equalling the subscriber number times ten.

FIG. 8 shows schematically the processing of recovered clocking pulse string b' (as from AND gate 67) and recovered command pulse string j (as from MONOSTABLE 80) after command pulse signal string e' has been separated thereinto (plus counter reset) as before by the mentioned components and other suitable logic circuitry as in FIG. 5. The successive clocking pulses are forwarded in the order in which they are received, incrementing the count of counter 82 accordingly. When the basic account number is reached by the clocking pulses the counter provides a corresponding pulse, which is determined by decoder 185; resulting pulse i is compared in controller 186 with the identically timed command pulse (if any) in string j. If a coincident command pulse is present, an output pulse is forwarded to the subscriber's cutoff device 160 to provide down-lead continuity. Otherwise, it is in the open position, whereupon relay 161 therein acts to cut off all program signals from proceeding further along down lead 27 to the subscriber's television receiver 5.

Each decoder here comprises circuitry equivalent to that of counter output AND gates 83, 84, and 85. Each controller corresponds similarly to BISTABLE 86 of FIG. 5 and operates a device (160 to 160N) for enabling or disabling program reception. Cut-off device 160 has just been described; traps 160A to 160N correspond to NOTCH FILTER AND CONVERTER 60 of FIG. 5. Equivalent circuitry may be substituted where appropriate, so long as the desired enabling (or disabling) end result is attained as desired.

Succeeding clocking pulses for a subscriber are treated similarly to the first, the second one going to the next higher bistable controller 186AB because of equalling the subscriber's account number plus one, etc. Each of the plurality of clocking pulses associated with such subscriber is compared similarly for coincidence with correspondingly timed command pulses. Whenever coincidence occurs, an enabling pulse goes to the corresponding trap. The successive controllers for any given subscriber may be thought of as controlling successive tiers of programs. Each succeeding controller is deemed to control a correspondingly numbered program set. The program signals enter by down lead 27 from cable 26 as before. A program set may comprise one or more than one program or, altnernatively, may be empty. Each program signal band is predetermined at the band end, of course, and is usually 6 MHz wide, and may be shifted in frequency by heterodyning with a fixed frequency generated by appropriate means (not shown) in the tap off so as to be accommodated by an available channel in the subscriber's receiver. Each succeeding controller in turn acts similarly upon a different set of program signals. Only those controllers for which an actuating pulse is received from the corresponding command string will enable program signals (if present) to pass via the down lead to the receiver.

It will be understood that head-end control of program allocation and of the command pulses on a one-program per serial pulse provides great flexibility in making programs selectively available. Selective programs availability is usually based on price to the subscriber but possibly based at least in part on other criteria (e.g., demographics; differential availability of certain programs from alternative sources, such as movie theaters, sports arenas; etc.). Especially where different price levels are the chief consideration, the programs may be thought of as available on different levels or tiers, such as (1) the basic or "free" programming for which the charge is included in a general fee; (2) "pay TV" program services, which may specialize in movies, sports, financial information, etc., for which the subscriber pays a periodic surcharge; and (3) pay-per-program services, charged for individually, such as current first-run movies or real-time sports events.

FIG. 8 shows a multiple-program tiering arrangement fed much as the simpler arrangement of FIG. 5 is fed. In FIG. 8, controller 186 for the base level or first tier controls cut-off relay 160 in cable 26 so that the head end can interrupt all service to a given subscriber very conveniently and simply if a suitable occasion should arise, such as failure to pay a basic monthly or other periodic fee. The relay is preferably of normally closed type and is opened by means of a disabling pulse supplied from the head end. Alternatively, it may be normally open and be closed by an enabling command pulse similarly supplied sufficiently often (e.g., every hour on the hour) at the head end so long as the subscriber is in good standing. This controller is fed by pulse i from decoder 185 (corresponding to gates 83, 84, and 85 of the FIG. 5 arrangement) and by a coincident command pulse (if present) from string j.

The output connection of controller 186AB of the second tier is to the arm of selector switch 120, which has five positions (A, B, C, D, and E) corresponding to the positions of auxiliary channel selector 6 at the subscriber's television receiver, as assured by selector switch controller 150 interconnected electrically to the channel selector and mechanically (broken line) to the selector switch. This second tier may correspond to a cable subscription service which offers the subscriber a choice of simultaneous programs (here, two) for the subscription fee. A single command pulse coincident with clocking pulse i′ enables removal of trap 160A or trap 160B upon actuation of dual second-tier controller 186AB in accordance with the subscriber's selection of program to watch.

The third tier controller in FIG. 8 is shown as segmented or subdivided into separate first, second, and third third-tier controllers 186C, 186D, and 186E—each fed with pulse i″ from decoder 185″, of course, but alternatively rather than simultaneously. Selector switch 130 is actuated by switching of the subscriber's auxiliary selector 6, to interconnect the respective controllers in turn, as the subscriber chooses from among several simultaneously available programs in the third tier, which may be of pay-per-program type, each such program being available at the same cost to the subscriber. Of course, positions A and B of this switch are vacant here because allocated to the second tier, as already noted.

If desired, the selector switch controller may be internally timed and controlled to be effective only for the first few minutes of a broadcast so that the subscriber's program selection becomes irrevocable after a reasonable period. That same result can be obtained by allocating one of the plurality of clocking pulses to the specific objective of inactivating the program selector in the absence of a corresponding command pulse, which would be supplied from the head end for only the first several minutes of the broadcast. Whether to provide and invoke such a feature will depend upon head-end policy.

Additional tiers can be provided, as suggested in FIG. 8, if and as desired. Also possible is a disabling command pulse to counteract the presence of an enabling command pulse, as an alternative to merely omitting an enabling command pulse. Such a disabling command pulse might be requested by a subscriber during certain times of day or week so as to make some or all programming temporarily unavailable even though previously requested by the subscriber and consequently authorized by the head end, or for which no positive request by the subscriber was necessary. In this manner the subscriber might control times and/or subject matter of viewing considered objectionable without deleting other times and subject matter paid for in the same "package" and considered unobjectionable. Such a modification would necessitate controllers receptive to both enabling and disabling command pulses, either in tandem or combined into one bistable controller.

FIG. 9 shows the utilization of two successive clocking pulses and their corresponding command pulses in accordance with such enabling/disabling pulse arrangement, as applied to the Nth tier. The Nth clocking pulse is allocated with the subscriber's count in "on" decoder $185^N$—and the (N+1)th clocking pulse in "off" decoder $185^{N+1}$—from which respective pulses $i^N$ and $i^{N+1}$ pass to the respective controllers. The presence of a command pulse along with the clocking pulse for the subscriber's number plus N provides an enabling output pulse from on/off controller 186N to open program trap 160N much as before. However, coincidence of a command pulse with the next clocking pulse, instead of sending a pulse to enable another tier's controller to unblock its program set signals, sends another pulse to Nth tier controller 186N. This second pulse acts as a disabling pulse by flipping the bistable controller from its enabling condition back to its previous disabling condition so that its filter or trap is activated once more to preclude program signals from passing to the subscriber's receiver.

FIG. 10-4 is similar to FIG. 4, but an exception is that this fragmentary illustration employs reference numerals higher by 100. Instead of starting—as in FIG. 4—with pulse 70 (denoting the 70th subscriber), here each pulse train starts with pulse 740, which is the last pulse (non-requesting) allocated to the 73rd subscriber. The pulse train shows all ten pulses (here denoted as 741 through 750) allocated to the 74th subscriber, and finishes with first pulse 751 (program-requesting) allocated to the 75th subscriber.

The waveforms themselves in the various rows in FIG. 10-4 are essentially unchanged from those of FIG. 4. However, here the circling of the reference numerals for pulses 741, 744, and 748 mean that the 74th subscriber has requested access to the programs in the first, fourth, and eighth tiers, as further evidenced by the presence of the first three square waves in row c, and by modified waveforms in rows d and e. The 75th subscriber has requested at least the first tier of programs, as shown by the encircling of 751.

FIG. 10-5 corresponds, again for the 74th subscriber, to part of FIG. 5, from the counter output to the notch filter input. The former single output (h) from the counter output AND gate (84) has given way here to three outputs (h1, h4, h8)—corresponding to the three requested tiers of programs from counter output AND gates 184, 184G, 184K. Dotted lines suggest omitted non-output gates, etc. Respective AND gates 185, 185G, 185K combine those outputs (singly) with clocking pulses b′ and then feed resultant pulses i1, i4, and i8 to bistable controllers 186, 186G, 186K—which receive command pulse spring j as well. The outputs go (via notch filter switches, not shown) to tiered filter/traps 161 161G, 161K to gate the requested program tiers to the subscriber's receiver(s).

FIG. 10-6 relates to FIG. 10-4 as FIG. 6 relates to FIG 4, showing the resulting multiple-pulse-per-subscriber waveforms, as will be understood readily enough from the foregoing account.

Other modifications may be made, as by adding, combining, or subdividing parts or steps of by substituting equivalents, while retaining advantages and benefits of the present invention, which itself is defined in the following claims.

The invention claimed is:

1. Program access tiering control method in a time-addressable access control system for cable TV subscribers, wherein program signals are transmitted via cable to local tapoff interconnections with subscribers' television receivers together with a series of clocking pulses corresponding to sequential arrangement of subscribers, the clocking pulses being accompanied by program access-enabling pulses for program-requesting subscribers, wherein sets of programs are arranged in different levels or tiers, such as according to different levels of subscriber charges, the tiering control method being characterized by including within the transmission to any given subscriber a plurality of clocking pulses time-addressed for such subscriber and corresponding to a plurality of program tiers, and including for any requesting subscriber enabling command pulses for each of the respective tiers so requested, thereby enabling the subscriber to select for reception a program from any such tier so requested and enabled.

2. Cable TV access control system with tiering control according to claim 1, wherein for at least one of the tiers a single enabling pulse gates to the subscriber's TV receiver a plurality of programs from which the subscriber can choose.

3. Cable TV access control system with tiering control according to claim 2, including for a subscriber access disabling command pulses for any of the respective tiers, thereby enabling the subscriber to deselect all programs in any such tier despite previous selection of any such program tier.

4. Cable TV access control system with tiering control according to claim 1, wherein for at least one of the tiers one or more separate enabling pulses gate to the subscriber's TV receiver a corresponding number of programs from which the subscriber can choose.

5. Cable TV access control system with tiering control method according to claim 1, wherein for at least one of the tiers a single enabling pulse gates to the subscriber's TV receiver a plurality of programs, and wherein for at least one of the tiers one or more enabling pulses gate to the subscriber's TV receiver a plurality of programs, from which the subscriber can choose.

6. Cable TV access control system with tiering control method according to claim 5, wherein the subscriber actively chooses a program from the enabled plurality of programs by selecting a corresponding channel at his television receiver.

7. Program access tiering control in a time-addressable access control system for cable TV, wherein at the head or transmitting end a serially ordered roster of all subscribers is maintained and a roster of program-requesting subscribers is compiled for a plurality of limited-access programs to be transmitted simultaneously by cable to all the subscribers' respective tapoff interconnections with the cable, and wherein the program signals are accompanied by successive clocking pulses identifiable with the respective subscribers, being characterized in that a plurality of such clocking pulses—for each subscriber—are identified also with respective tiers of such limited-access programs, at least one program per tier, and including means for transmitting, along with the clocking pulses for the respective program-requesting subscribers, enabling pulses whose reception at their interconnections with the cable is effective to gate one or more requested tiers of programs identified therewith from the interconnections to the TV receivers of requesting subscribers.

8. Cable TV access control system with tiering control according to claim 7, including, at each subscriber's tapoff, single controller means controlled from the head or transmitting end to enable access to all the programs in a given tier having a requested program among a plurality of simultaneously transmitted programs in the tier, and including downstream therefrom at the reception end program channel selection means actuatable by the subscriber to choose at or about the time of transmission a program in that tier for reception at the subscriber's TV receiver.

9. Cable TV access control system with tiering control according to claim 7, including, at each subscriber's tapoff, a plurality of like controller means similarly controlled from the head or transmitting end, each such controller being adapted to enable access to corresponding individual programs in a given tier having a like plurality of simultaneously transmitted programs in the tier, and including downstream therefrom at the reception end program controller selection means actuatable by the subscriber to choose at or about the time of transmission a program in that tier for reception at the subscriber's TV receiver.

10. Program access tiering control means in a time-addressable access control system for cable TV subscribers, wherein sets of programs transmitted via the cable to tapoff interconnections with the respective subscribers occupy various levels or tiers, such as according to different levels of subscriber charges, the program tiering control means comprising, at a tapoff for any given subscriber, means for receiving a series of clocking pulses transmitted to all subscribers, including means for identifying therein a plurality of clocking pulses time-addressed for such subscriber and corresponding to a plurality of program tiers, and including control means for identifying, when present for a given requesting subscriber in such plurality of identified pulses, access command pulses for any of the respective tiers so requested, and also means responsive to such access command pulses for gating to the subscriber's TV receiver the programs of any such requested tier, thereby enabling the subscriber to select a program in any such tier.

11. Cable TV access control system with tiering control according to claim 10, including in the gating means, for a given tier, cut-off means controlled from the head or transmitting end, responsive to that tier's control means, and effective to preclude reception of programs at the level of that tier and at the level of any and all further tiers.

12. Cable TV access control system with tiering control according to claim 10, wherein, for at least one given tier, the control means comprises a single controller for a plurality of programs, and the gating means enables the subscriber to receive, and selection means within the subscriber's control and connected thereto enables the subscriber to select from, the set of programs available in that tier.

13. Cable TV access control system with tiering control according to claim 10, wherein, for at least one given tier, the control means comprises a plurality of controllers for a like plurality of programs, and the gating means enables the subscriber to receive, and selection means within the subscriber's control and connected thereto enables the subscriber to select from, the set of programs available in that tier.

14. Cable TV access control system with tiering control according to claim 10, wherein the series of clocking pulses includes for at least one tier a pair of consecutive pulses, and the control means includes means for separately identifying and discriminating between said pulses, and wherein presence of an access command pulse along with one of said pulses enables the gating, but presence of an access command pulse with the other of said pulses disables the gating, of program signals to the subscriber's TV receiver.

15. Cable TV access control system with tiering control according to claim 10, including also gating means connected to the control means and responsive thereto, but beyond the control of the subscriber, to make one or more programs in any requested tier available to the subscriber's TV receiver, and channel selection means within the control of the subscriber to enable selection of a preferred program when a plurality of programs are available in any such tier.

16. Cable TV access control system with tiering control according to claim 10, wherein the tapoff includes stepping means responsive to the subscriber's actuation of the channel selection means and effective to discriminate between channels on which simultaneously available programs are available to the subscriber's television receiver.

* * * * *